G. W. PRICE.
Wheel-Cultivator.

No. 61,566.

Patented Jan. 29, 1867.

Witnesses:
J. A. Service
Thos. Tusch

Inventor:
Geo. H. Price
Per Munro & Co.
Attorneys

United States Patent Office.

GEORGE W. PRICE, OF BLOOMINGTON, ILLINOIS.

*Letters Patent No. 61,566, dated January 29, 1867.*

---

IMPROVEMENT IN GANG-PLOUGH AND CULTIVATORS.

---

*The Schedule referred to in these Letters Patent and making part of the same.*

---

TO ALL WHOM IT MAY CONCERN:

Be it known that I, GEORGE W. PRICE, of Bloomington, in the county of McLean, and State of Illinois, have invented a new and useful Improvement in Cultivators; and I do hereby declare that the following is a full, clear, and exact description thereof, which will enable those skilled in the art to make and use the same, reference being had to the accompanying drawings, forming part of this specification, in which—

Figure 1:
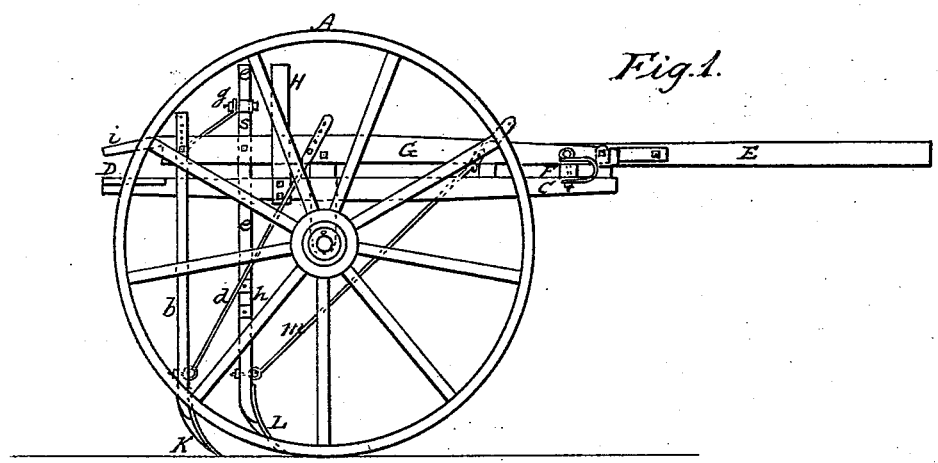
Figure 2:
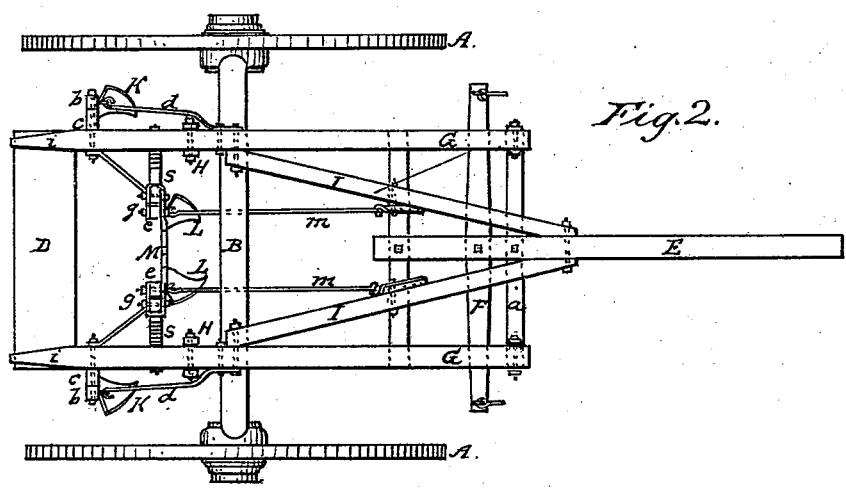
Figure 3:
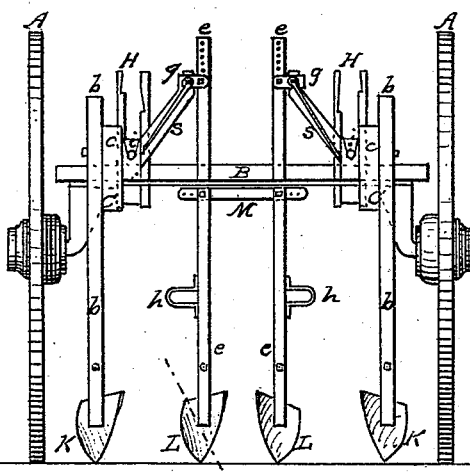

Figure 1 is a side elevation of my improved cultivator.
Figure 2 is a plan.
Figure 3 is a rear view.
Similar letters of reference indicate corresponding parts.

This invention relates to improvements in the construction of cultivators, and consists in an arrangement of the framing and method of attaching and operating the ploughs, as well as their form, combining great simplicity and strength with light draught and good execution of the work. There are two right and two left-handed ploughs, which are so attached to the frame that they are easily changed in position to work for throwing the dirt either to or from a row of corn, or to throw the dirt all one way and level the ground, and be used as a seeding plough. These changes are very simple, and may be made in a few minutes by shifting the bolts which fasten the plough-sheaths to the frame. By a very simple device the distance between the inside ploughs may be readily changed to suit the cultivation of corn in the different stages of its growth, and they are so attached and suspended to the frame as to be entirely under the control of the ploughman either by lifting or swinging out of the way of the corn when necessary.

A A are the two driving-wheels on the axle B, the arms of which are bent downward to give the frame proper elevation for working among corn by straddling the rows, as shown in fig. 3. C is a rectangular frame, fastened to the under side of the axle B, at the rear of which frame is the driver's seat D. E is the draught-pole, and F the double-tree or evener. At the ends of the cross-brace $a$, in the front part of the frame C, are pivoted the long beams G G, which run back over the sides of the frame C to the driver's seat, terminating in handles $i\ i$, by which they may be lifted, when desired, for the purpose of raising the ploughs out of the ground. Fastened to the frame C, just behind the axle B, are slotted uprights or guide-bars, H H, which are guides for the vibratory beams G G. These beams are connected by braces, I I, on the inside with the draught-pole E, to which they are pivoted at their fore ends, so as to rise and fall at their rear ends with the vibratory beams G G. The sheaths $b\ b$ of the shovel-ploughs K K on the outside are fastened by adjustable bolts to bolsters, $c\ c$, on the rear part of the vibratory beams G G, and they are also connected by brace rods, $d\ d$, with these beams forward of the guide-bars H H. The sheaths $e\ e$ of the inside ploughs L L are suspended to swivel couplings, $g\ g$, fastened on the upper ends of short standards, $s\ s$, on the vibratory beams G G, and they are connected by brace rods $m\ m$ with the brace bars I I, and also with each other by a cross-bar, M, by which the ploughs may be set nearer together or farther apart by shifting the coupling-bolts, in order to adapt them to the cultivation of corn at different stages of its growth, or as required. By means of this suspension arrangement of the sheaths of the inside ploughs, and their connection with the pivoted cross-bar M, the ploughman on his seat, D, has entire control over the ploughs and can readily move them from side to side with his feet placed in the stirrups $h\ h$ on the sides of the sheaths $e\ e$. The driver may also, at pleasure, lift the ploughs out of the ground by means of the handles $i\ i$ on the rear ends of the vibratory beams G G. The upper ends of all the plough-sheaths and brace-rods have holes in them, to receive coupling-bolts for adjustment of the ploughs at any desired position as to relative depth in the ground, and they may all be shifted so as to throw the dirt toward or from the row of corn, or in one direction to level the ground and work as a seeding-plough. The right and left-hand shovels or shares are constructed with their inner edges forming cutting edges, and their concave faces receiving and throwing the dirt in an opposite direction from said cutting edges in such a manner that the said cutting edges shall balance the throwing surface, thereby preventing any lateral pressure upon the ploughs while working; or, in other words, that the pressure shall be equal upon both sides of the shovels or shares.

Having thus described my invention, what I claim as new, and desire to secure by Letters Patent, is—

1. The combination of the vibrating beams G G and the braces I I, connecting them with the draught-pole E; the outside ploughs K K, connected by the sheaths $b\ b$ and the rods $d\ d$ with the beams G G; nd the inside ploughs L L connected by the swivel couplings $g\ g$ to the standards $s\ s$, and the rods $e\ e$ to the braces I I, arranged and operating substantially as and for the purposes herein described.

2. Forming the shovels or shares K K, L L, in such a manner that if a line were drawn in its oblique section, as shown in fig. 3 of the drawings, the same would stand at an angle of about twenty-two degrees from the standards $b\ b$, $e\ e$, to which the shovels or shares are attached, and said ploughs having such a bevel that the point of the cutting edge when throwing inwardly shall be upon the inside of a line continued in the direction of the length of the standards $b\ b$, $e\ e$, and said point when throwing outwardly shall be upon the outside of said line, for the purpose of preventing any lateral pressure, substantially as herein set forth.

G. W. PRICE.

Witnesses:
  W. WEYAND,
  OLIVER BEEBE.